United States Patent [19]

Namai et al.

[11] Patent Number: 4,710,010

[45] Date of Patent: Dec. 1, 1987

[54] LENS BARREL DRIVING DEVICE FOR CAMERA

[75] Inventors: Akihiro Namai, Kanagawa; Akira Egawa; Takanori Kodaira, both of Tokyo, all of Japan

[73] Assignee: Canon Kabushiki Kaisha

[21] Appl. No.: 13,198

[22] Filed: Feb. 9, 1987

Related U.S. Application Data

[63] Continuation of Ser. No. 713,473, Mar. 19, 1985, abandoned.

[30] Foreign Application Priority Data

Mar. 19, 1984 [JP] Japan ................................. 59-51226
Mar. 19, 1984 [JP] Japan ................................. 59-51228

[51] Int. Cl.$^4$ .............................................. G03B 3/10
[52] U.S. Cl. ...................................... 354/400; 74/575
[58] Field of Search ..................... 354/195.1, 400, 403, 354/405, 448, 453, 235, 234.1, 258.1, 271.1, 402, 212, 213, 252; 74/575, 576, 578

[56] References Cited

U.S. PATENT DOCUMENTS 4,205,906  6/1980  Imura ................................. 354/402
4,403,844  9/1983  Namai et al. ...................... 354/402 X
4,560,266 12/1985  Namai et al. ...................... 354/400

Primary Examiner—L. T. Hix
Assistant Examiner—Brian W. Brown
Attorney, Agent, or Firm—Toren, McGeady & Associates

[57] ABSTRACT

A device for driving the axial movement of a photographic lens barrel of a camera including a distance adjusting ring having a number of cam portions of similar shape arranged successively on the front end of the ring to cooperate with a follower on the barrel, a ratchet mechanism for turning the ring from the initial or first to the terminal or second position of each cam portion, a rotor arranged in a magnetic field to drive the ratchet mechanism, and a circuit for controlling the current supply to the rotor. After an exposure has been completed, as the ring is further turned in the same direction, when the terminal end of the cam portion moves away from the follower, the lens barrel is set in the initial position of the next cam portion. The rotor control circuit is provided with a switch arranged to open after the lens barrel has moved some distance from the initial position, whereby the circuit is rendered responsive to the closure of the switch for stopping the current supply to the rotor.

18 Claims, 10 Drawing Figures

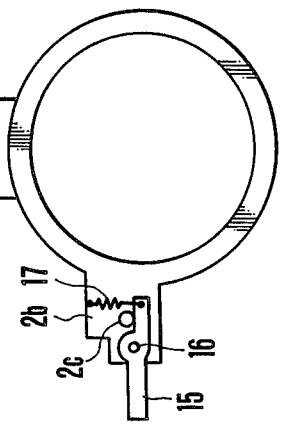
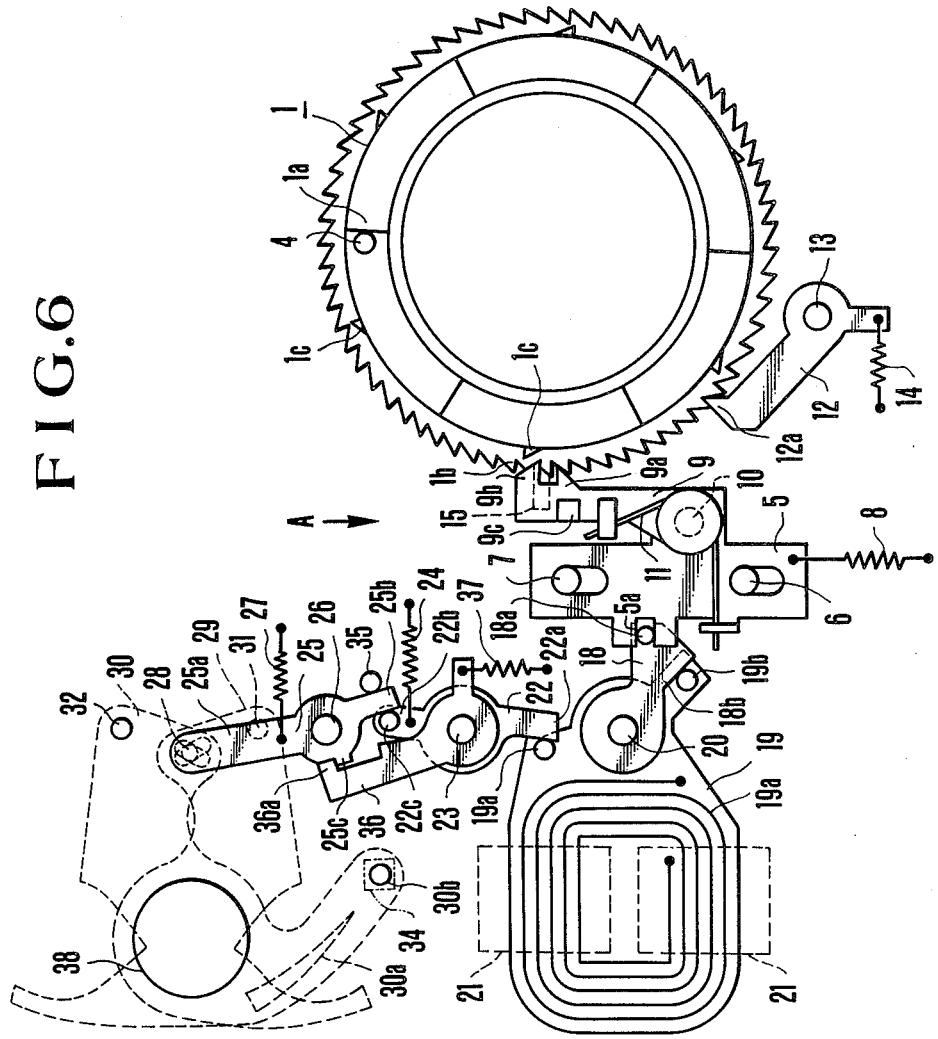

LENS BARREL DRIVING DEVICE FOR CAMERA

This is a continuation of application Ser. No. 713,473 filed Mar. 19, 1985, now abandoned.

BACKGROUND OF THE INVENTION

1. Field of the Invention

This invention relates to driving devices for moving the photographic lens barrel of a camera stepwise.

2. Description of the Prior Art

Devices of this kind generally operate in such a manner that prior to making an exposure, the lens barrel is axially moved forward to focus on an object to be photographed, and after the exposure is completed, it is further moved forward until one cam moves away from the follower on the lens barrel so that the lens barrel is set in the initial position of the next cam and at the same time the drive circuit is rendered inoperative.

To detect when the lens barrel reaches the initial position of the next cam, it has been the common practice in the prior art that while the number of ratchet teeth in each cam is being memorized, after the exposure is completed, a corresponding number of cycles of reciprocating operation to that obtained by subtracting the required number of cycles of reciprocating operation for the focusing adjustment from the total number of ratchet teeth in each cam, is counted as the lens barrel further moves axially forward. When the counting is completed, the drive circuit stops the supply of driving power to the ratchet mechanism. In this case, however, if it happens that one of the total sum of the cycles of reciprocating operation failed to advance the distance adjusting ring by the distance of one ratchet tooth, for example, through no teeth, or two teeth at a time, the phase of rotation of the distance adjusting ring errs with the result that for all subsequent exposures, the focusing of the photographic lens will not accurately be adjusted.

SUMMARY OF THE INVENTION

It is, therefore, a first object of the present invention to eliminate the above-described drawback, and to provide the device with a detector switch arranged to open and close when the lens barrel moves forward from one of the initial positions and is reset in the next initial position, whereby the switching operation of this detector is made to determine when the current supply to an electromagnet for driving the motion of the barrel is stopped.

A second object of the invention is to make the current supply control circuit responsive to the switching operation of the detector after the barrel has moved a certain distance from the initial position.

A third object of the invention is to prevent the distance adjusting ring from overrunning to a point beyond the initial position by inertia when the cam of the distance adjusting ring moves away from the follower to reset the barrel in the initial position after the exposure operation is terminated.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

FIG. 6 is similar to FIG. 1 except that another embodiment of the invention is illustrated.

FIG. 7 is a front elevational view illustrating the relationship between the release lever and the barrel of FIG. 6.

FIG. 8 is a side elevational view looking from the direction of arrow A of FIG. 6.

DESCRIPTION OF THE PREFERRED EMBODIMENTS

Figure 1:
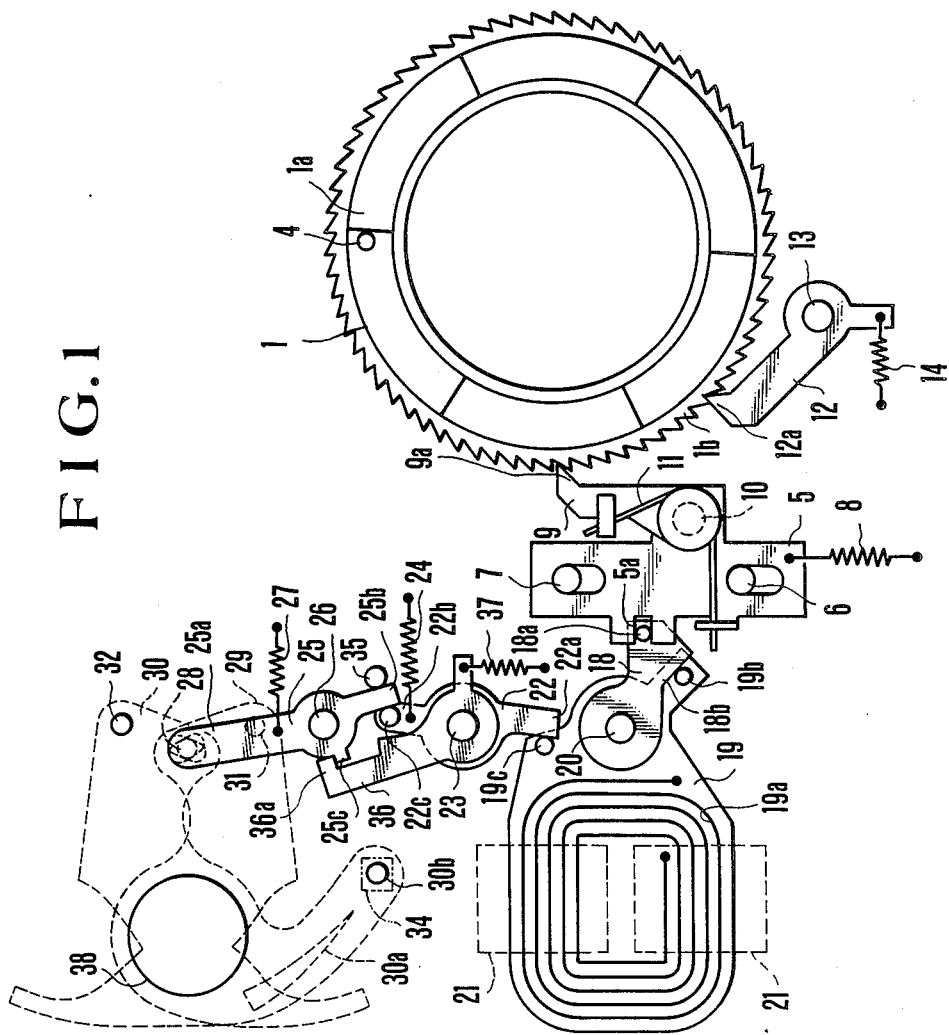
FIG. 1 is an elevational view of an embodiment of a barrel driving device for a camera according to the present invention.

An embodiment of the invention is next described by reference to FIGS. 1 to 4. In FIG. 1, a distance adjusting ring 1 is arranged on the outer diameter of a photographic lens barrel shown in FIG. 2 to be rotatable with the help of a ball bearing or the like for the purpose of smooth operation thereof. The barrel 2 is urged to the rear by a spring 3 and is axially movable while being restrained from rotation. On the front end of the ring 1 there are six focusing control cams 1a of similar shape successively arranged in a common circle to cooperate with a follower 4 on the barrel 2 which also serves as a member for finely adjusting the axial position of the barrel to focus on an infinitely distant object, so that when the distance adjusting ring 1 turns in a clockwise direction as viewed in FIG. 1, the barrel 2 is moved axially forward. Ratchet teeth 1b are formed in the outer periphery of the ring 1 throughout the entire length thereof. A reciprocating slide plate 5 has two slots in which engage respective pins 6 and 7 fixedly mounted on a base plate (not shown). A spring 8 urges the slide 5 to a downward direction. A ratchet 9 is pivotally mounted on a pin 10 of the slide plate 5. A spring 11 urges the ratchet 9 in a clockwise direction as viewed in FIG. 1 with its nose to engage one of the ratchet teeth 1b. A pawl lever 12 is pivotally mounted on a pin 13 fixedly mounted to the base plate and is urged by a spring 14 in a clockwise direction with its nose 12a engaging with one of the ratchet teeth 1b to restratin counterclockwise movement of the ring 1 resulting from the bias force of the spring 3 through the cam 1a-and-follower 4 connection. A drive lever 18 and a rotor 19 are pivotally mounted on a common pin 20 fixedly mounted to the base plate (not shown). The drive lever 18 has a pin 18a extending into a cutout 5a of the reciprocating slide plate 5 so that when the drive lever 18 turns in a counterclockwise direction, the slide 5 moves upward. The rotor 19 has a printed coil 19a which upon supply of current thereto exerts magnetomotive force. With permanent magnet pieces 21, the rotor 19 reacts to this force, rotating from an illustrated or neutral angular position in a counterclockwise direction when the current flow to the coil 19a takes a certain direction, whereby the drive lever 18 is turned in a counterclockwise direction by a pin 19b on the rotor 19 in engagement with the side edge 18b of the drive lever 18. When the direction of the current flow is reversed, the rotor 19 rotates from the illustrated position in a clockwise direction, whereby a shutter mechanism is operated. Hereinafter, the direction of current flow for driving the barrel will be called the "normal" direction, and that of current flow for operating the shutter mechanism the "reverse" direction.

A shutter drive lever 22 is pivotally mounted on a pin 23 fixedly mounted to the base plate and is urged by a spring 24 in a clockwise direction so that its one arm 22a abuts on a pin 19c of the rotor 19. Therefore, when the rotor 19 turns clockwise, the shutter drive lever is turned in a counterclockwise direction. A blade opening-closing lever 25 is pivotally mounted on a pin 26 fixedly mounted to the base plate, and is urged by a spring 27 in a clockwise direction. Its one arm 25a has a blade drive pin 28 fixedly mounted at the end and extending into slots of shutter blades 29 and 30. The shutter blades 29 and 30 are pivotally mounted on pins 31 and 32 respectively fixedly mounted to the base plate. When the lever 25 turns in the clockwise direction, therefore, the shutter blades 29 and 30 are opened from the illustrated position where they are closed. 34 is a photoelectric transducer element for light measurement; 30a is an auxiliary aperture opening for light measurement; 30b is a preceding opening for low brightness warning. The other arm 25b of the blade opening-closing lever 25 is urged by a spring 27 to abut on a pin 22c of the shutter drive lever arm 22b. Because the spring 24 of the shutter drive lever 22 is stronger than the spring 27, the shutter blades 29 and 30 are held in an aperture closing position defined by a stopper pin 35 for the lever 25. A blade latching lever 36 is pivotally mounted on the pin 23 and is urged by a spring 37 in a clockwise direction. At its free end there is a nose 36a abutting on the side edge of the lever 25. Soon after the lever 25 starts to turn, a projection 25c comes to engage the nose 36a. An exposure aperture 38 is formed in the base plate. Though this aperture 38 is actually aligned to the optical axis of the barrel 2, it is here depicted as out of alignment for the purpose of providing a better understanding.

Figure 2:
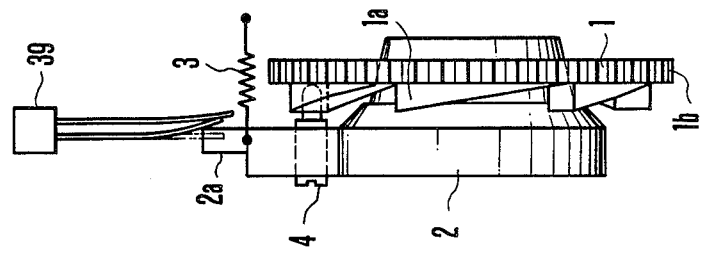
FIG. 2 is a side elevational view illustrating the relatioship between the distance adjusting ring and the barrel of FIG. 1.

In FIG. 2, a lens stop switch 39 (hereinafter abbreviated "LS" switch) is arranged adjacent an arm 2a of the barrel 2 to turn off when the barrel 2 moves axially forward some distance from the initial position and to turn on again when one of the cams 1a moves away from the follower 4.

Figure 3:
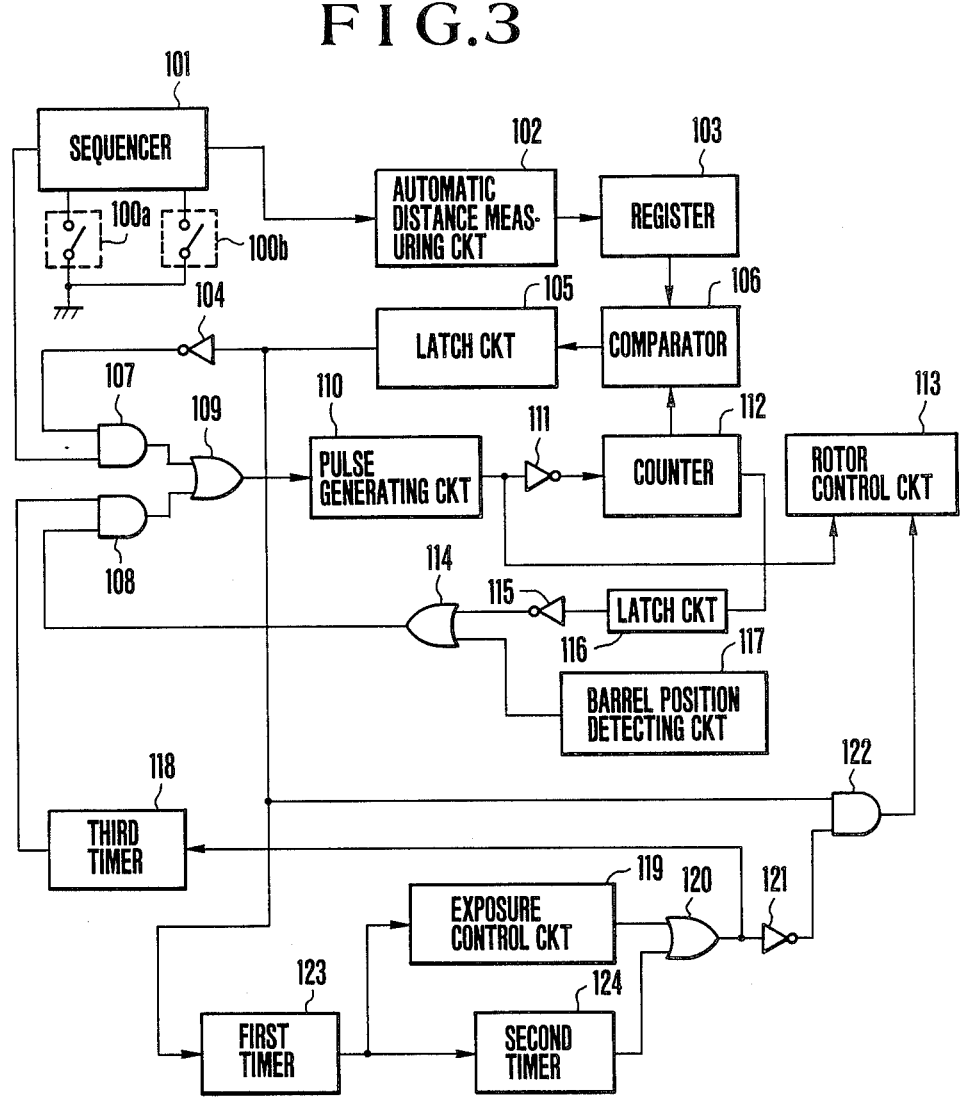
FIG. 3 is an electrical circuit diagram of the driving device of FIG. 1.
Figure 4:
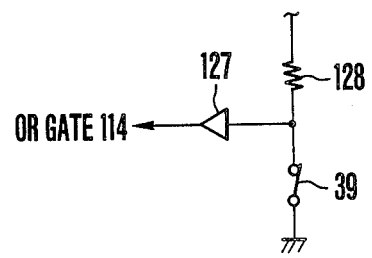
FIG. 4 illustrates the details of the barrel position detecting circuit of FIG. 3.
Figure 5:
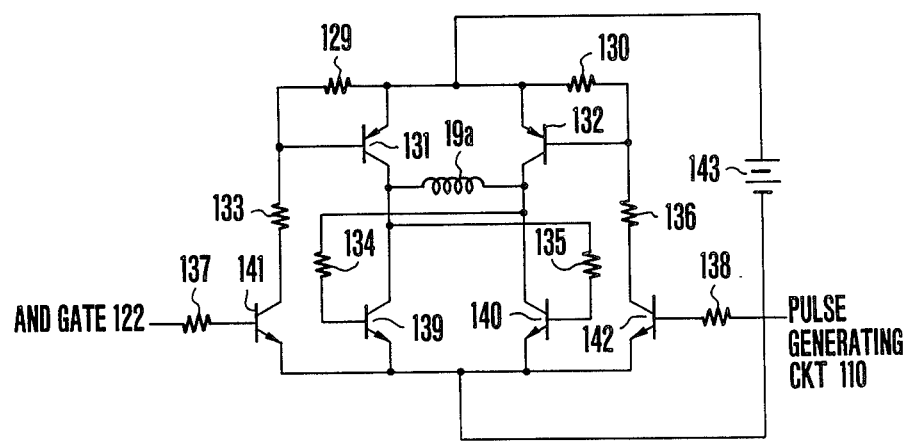
FIG. 5 illustrates the details of the rotor control circuit of FIG. 3.

Here shown in FIG. 3 is a control circuit for the barrel driving device shown in FIG. 1. A sequencer 101 for controlling the sequence of operations of the camera has a first switch 100a arranged to be closed when a release button is pushed down to a first stage, and a second switch 100b arranged to be closed when the release button is further pushed down to a second stage. An automatic distance measuring circuit 102 is rendered operative by a signal from the sequencer 101. The output of the circuit 102 representing the measured object distance is on a stored register 103. A latch circuit 105 receptive of the output of a comparator 106 produces an output which is then applied through an inverter 104 to an AND gate 107 at one input thereof, the other input of which is connected to another output of the sequencer 101. The output of the AND gate 107 and the output of another AND gate 108 are applied through an OR gate 109 to a pulse generating circuit 110. A train of pulses from the circuit 110 has a frequency suited to stepwise driving of the barrel 2, with ON and OFF times, for example, each in 10 msec. and are applied either directly to a rotor control circuit 113, or through an inverter 111 to a counter 112. As the output of this counter 112 is always compared with the output of the register 103 (the object distance information), when they come to coincide with each other, or when the lens is in focus, the output of the comparator 106 changes to high level. The output of the counter 112 is also applied through a latch circuit 116, an inverter 115 and an OR gate 114 to the AND gate 108. The other input of the OR gate 114 is connected to the output of a barrel position detecting circuit 117 which, as shown in FIG. 4, comprises a pull-up resistor 128 connected to the LS switch 39 with their junction point connected to a buffer 127. When the barrel 2 lies at or near the initial position, the LS switch 39 is closed, causing the buffer 127 to produce an output of low level. After the barrel 2 has moved some distance from the initial position, the LS switch 39 is turned off, and a signal of high level from the buffer 127 is given to the OR gate 114. The output of the latch circuit 105 is also connected to an AND gate 122 at one input thereof, the other input of which is connected to the output of an inverter 121 having an input connected to the output of an OR gate 120. The output of the AND gate 122 is connected to another input of the rotor control circuit 113. The rotor control circuit 113, as shown in FIG. 5, comprises pull-up resistors 129 and 130, current limiting resistors 133 to 138, transistors 131, 132, and 139 to 142, and a battery 143. Now assuming that the pulse generating circuit 110 produces a first pulse, then the transistor 142 is turned on. The transistor 132 whose base is connected through the resistor 136 to the collector of the tranistor 142 is also turned on. At the same time, another base current also flows through the resistor 134 to the transistor 139, whereby the transrstor 139 is turned on. As a result, the printed coil 19a on the rotor 19 is supplied with current flowing from the right to the left as viewed in FIG. 5, or in the normal direction. Alternatively assuming that the ouput of the AND gate 122 changes to high level, then the transistors 141, 131 and 140 are turned on, allowing current to flow through the printed coil 19a from the left to the right, or in the reverse direction.

Also the output of the latch circuit 105 is applied to a first timer 123. The output of the timer 123 is used for actuating an exposure control circuit 119 and a second timer 124. The outputs of the exposure control circuit 119 and the second timer 124 are connected to the respective inputs of the OR gate 120. The output of the OR gate 120 is connected to an input of a third timer 118 whose output is connected to another input of the AND gate 108, and is connected through the inverter 121 to the AND gate 122.

The operation of the device is as follows: When the release button is pushed down to the first stroke, the switch 100a is turned on, whereby the circuit is supplied with electrical power, and a first operation of the camera is started. An actuating signal from the sequencer 101 is applied to the automatic range finding circuit 102, whereby the object distance is measured in the form of a number of ratchet teeth by which the distance adjusting ring is to be turned from the initial position. This number is memorized in the register 103. Upon further depression of the release button, the switch 100b is turned on, whereby the battery is latched until the sequence of camera operations comes to an end, and a signal of high level from the sequencer 101 is applied to the AND gate 107. Since the output of the latch circuit 105 in the initial state is of low level, this is inverted by the inverter 104 to high level. Because this is applied to the other input terminal of the AND gate 107, the output of the AND gate 107 changes to high level. The output of the OR gate 109 then changes from low to high level by which the pulse generating circuit 110 is rendered operative. For the first pulse of 10 msec. duration, the rotor control circuit 113 turns the rotor 19 in the counterclockwise direction. During this, its pin 19b pushes the end portion 18b of the drive lever 18, turning the drive lever 18 also in the counterclockwise direction. Such movement of the drive lever 18 is transmitted through the pin 18a-and-cutout 5a connection to upward movement of the reciprocating slide plate 5 along with the ratchet nose 9a in engagement with one of the ratchet teeth 1b, while turning the distance adjusting ring 1 in the clockwise direction. When the ring 1 has turned through the length of one ratchet tooth, the pawl lever 12 moves into engagement with the next tooth to enable the slide plate 5 to move downward, the ring 1 is left in the advanced position by one tooth. It should be pointed out here that in order to insure that for every one cycle of reciprocating operation of the slide 5, one tooth moves away from the pawl 12, the distance the slide 5 moves upward in one cycle is previously determined to be considerably longer than the separation between the successive two teeth. This in turn requires that when the current supply to the rotor 19 is cut off, the distance adjusting ring 1 be moved backward to absorb the excess of the forward rotation. In this instance, however, the backward driving power is obtained from the spring 3 of the lens barrel 2 through the cam follower pin 4 impelling the cam 1a sideward. Such downward movement of the slide 5 is driven by the spring 8, causing the rotor 19 also to return to the initial position along with the drive lever 18. Such procedure repeats itself a corresponding number of times to the aforesaid measured object distance, or until the barrel 2 reaches an in-focus position.

Meanwhile, the output of the pulse generating circuit 110 after having been inverted by the inverter 111 is applied to the counter 112. Therefore, the counter 112 counts up each pulse in synchronism with the termination of duration of energization of the rotor 19. When the number of pulses counted by the counter 112 reaches the value stored on the register 103, the comparator 106 produces an output of high level which is then latched by the latch circuit 105, and, further after having been inverted to a low level by the inverter gate 104, is applied to the AND gate 107, whereby the output of the AND gate 107 is changed to a low level, and the output of the OR gate 109 is also changed to a low level. Thus, the pulse generating circuit 110 is rendered inoperative, and, responsive to this, the rotor control circuit 113 stops the focusing operation by the rotor 19.

Also since the output of the latch circuit 105 is applied to one of the inputs of the AND gate 122, the other input of which has been supplied with the signal of high level from the inverter gate 121, the output of the AND gate 122 changes to a high level. Responsive to this, the rotor control circuit 113 supplies the rotor 19 with current flowing in the reverse direction therethrough. The rotor 19 is thereby turned in the clockwise direction, while its pin 19c turns the shutter drive lever 22 in the counterclockwise direction. The pin 22c then strikes the side edge of the latch lever 36, causing the nose 36a to retract from the path of movement of the projection 25c of the blade opening-closing lever 25. The lever 25 is therefore turned by the spring 27 in the clockwise direction, opening the shutter blades 29 and 30 to initiate an exposure.

Such change of the output of the latch circuit 105 further causes the first timer 123 to count the time from the moment at which the reverse current supply to the rotor 19 has been started to the moment at which the shutter blades 29 and 30 start to open the exposure aperture 38. At the end of the counting, the output of the first timer 123 then goes to a high level, initiating an operation of the exposure control circuit 119 having the light meter with the photoelectric sensor 34. From this time onward, the sensor 34 receives light from an object to be photographed through the opening of the auxiliary diaphragm aperture 30a of the shutter blade 30. It is also at the change of the output of the first timer 123 to a high level that the second timer 124, too, starts to operate, whereby a maximum allowable shutter time is counted. Based on the timing of whichever occurs first of the terminations of duration of a computed exposure time and the maximum allowable time, the output of the OR gate 120 changes to high level. Then, the output of the inverter gate 121 changes to a low level. Then the output of the AND gate 122 changes to a low level, whereby the reverse current supply to the rotor 19 is cut off by the control circuit 113. Therefore, the shutter drive lever 22 is turned by the spring 24 in the clockwise direction, while the pin 22c on its one arm 22b pushes the arm 25b of the blade opening-closing lever 25 to turn the lever 25 in the counterclockwise direction. Thus, the shutter blades 29 and 30 are closed. Also at the same time, the other arm 22a of the shutter drive lever 22 pushes the pin 19c of the rotor 19 to turn the rotor 19 in the counterclockwise direction to the illustrated initial position. The time interval from the moment at which the output of the OR gate 120 is changed to a high level, or the reverse current supply to the rotor 19 is cut off to the moment at which the exposure aperture 38 has been entirely closed by the shutter blades 29 and 30, is counted by the third timer 118. When the counting is completed, a signal of high level is given to the AND gate 108. The latch circuit 116 latches the output of low level from the counter 112. Since the other input terminal of the AND gate 108 is supplied with the output of high level from the inverter gate 115 through the OR gate 114 in response to the output of low level from the latch circuit 116, such change of the output of the third timer 118 causes change of the output of the AND gate 108 to a high level, and, therefore, of the output of the OR gate 109 also to a high level, whereby the pulse generating circuit 110 is rendered operative. As has been mentioned above, therefore, the rotor control circuit 113 supplies a normal current to the rotor 19. Thus, the barrel 2 is again moved axially forward.

It should be pointed out here that, at a time either during the first or focusing movement of the barrel 2, or during the subsequent or second mevement, the LS switch 39 was or is turned off respectively. Because, as has been described above, the distance adjusting ring 1 overruns one tooth in the first half of each cycle of reciprocating operation and then returns slightly to an exactly one-tooth ahead position, the barrel 2 behaves in such a way that it advances two paces and retreats one pace. Just before the LS switch 39 comes to the open position continuously, therefore, it will often happen that the LS switch 39 after having once been opened in the first half of the cycle, is closed again in the second half cycle. To prevent a faulty operation from occurring with this, in the present embodiment of the invention, the design of the counter 112 is made in such a way that as, for example, twelve of the ratchet teeth 1b are assigned to each of the cams 1a, for the first nine of this in movement, the signal from the LS switch 39 is ignored. That is, the LS switch 39 is arranged to open before the 9th cycle of reciprocating operation is executed.

Therefore, as the counter 112 counts drive pulses in addition to the number of pulses counted when in focusing, when the total sum of the numbers of drive pulses counted becomes 9, the counter 112 produces an output of high level which is then applied to the latch circuit 116. The latched output of high level from the latch circuit 116 is supplied to the OR gate 114 through the inverter gate 115. Since, at this time, the LS switch 39 has already been open, because the barrel position detecting circuit 117 gives its output of high level to the other input terminal of the OR gate 114, the output of the OR gate 114 remains at a high level, permitting the barrel 2 to continue being driven to move.

When one of the cams 1a of the distance adjusting ring 1 moves away from the follower 4, the barrel 2 is moved rearward to another initial position by the spring 3 where the LS switch 39 is closed. The output of the barrel position detecting circuit 117 then changes to a low level, whereby the output of the OR gate 114 is changed to low level, and the outputs of the AND gate 108 and the OR gate 109 are also changed to a low level. Therefore, the current supply to the rotor 19 is stopped, and the reciprocating slide plate 5, ratchet 9, and the rotor 19 are returned to the initial position shown in FIG. 1 by the spring 8. Thus, all the parts except the distance adjusting ring 1 regain their initial positions, and the sequence of camera operation for one exposure is completed.

As has been described above, according to one embodiment of the present invention, by the signal obtained from the use of a simple switch arranged to open and close when the photographic lens barrel moves forward and backward, it is made possible to assure that the barrel of the barrel driving device is stopped in the initial position.

Another embodiment of the invention is described by reference to FIGS. 6 to 8, where the same reference characters have been employed to denote the similar parts to those of the foregoing embodiment. In FIG. 6, an equal number of detent pawls of opposite orientation to the ratchet teeth 1b to the number of cams 1a are arranged on the outer periphery of the distance adjusting ring 1. The ratchet 9 of FIG. 1 is provided with another nose 9b arranged to engage one of the detent pawls 1c when the cam 1a moves away from the follower 4. A release lever 15 is pivotally mounted on a pin 16 fixedly mounted to another arm 2b of the barrel 2 and is urged by a spring 17 to turn in a counterclockwise direction until it abuts on a stopper pin 2c.

The operation of the mechanism of FIGS. 6 to 8 is next described with reference to FIGS. 2 to 4. Since the focusing and exposure operations are the same as in the foregoing embodiment, the following explanation begins with the start of a resetting operation of the barrel. To return the barrel 2 to the initial position, the rotor 19 is again supplied with current flowing in the normal direction therethrough. The above-described reciprocating operation is recycled to turn the distance adjusting ring 1 in the clockwise direction, whereby the barrel 2 is further moved axially forward. In the last cycle of reciprocating operation, one of the cams 1a moves away from the follower 4 of the barrel 2. It should be recognized here that just when the terminal end of the cam 1a spaces out from the follower 4, the load on the distance adjusting ring 1 suddenly disappears. By its inertia, therefore, the ring 1 tends to further turn. At this time, however, the second nose 9b of the ratchet 9 catches the detent pawl 1c. Thus, the distance adjusting ring 1 is securely arrested in the initial position. Another feature is that the rearward movement of the barrel 2 to the initial position causes a bent-off portion 15a of the release lever 15 to push the ratchet 9 at a tapered portion 9c thereof as shown in FIG. 8. Therefore, the ratchet 9 is turned in the counterclockwise direction, whereby the nose 9b of the ratchet 9 is disengaged from the detent pawl 1c. At the same time, the LS switch 39 is turned on by the arm 2a of the barrel 2, whereby the output of the barrel position detecting circuit 117 is changed to a low level. Responsive to this, the OR gate 114 changes its output to a low level, and the AND gate 108 and the OR gate 109 also change their outputs to a low level, whereby the operation of the pulse generating circuit 110 is stopped, and the current supply to the rotor 19 is terminated. Therefore, the reciprocating slide plate 5 along with the ratchet 9 returns to the initial position by the spring 8. At a point during this time, the ratchet 9 is taken out of abutting engagement on the release lever 15. After that, the ratchet 9 turns in the clockwise direction by the spring 11. Thus, all the parts except the distance adjusting ring 1 are reset in the initial position of FIG. 6, terminating the sequence of camera operations for one exposure.

It is to be noted that in the early stage of forward movement of the barrel 2, the release lever 15 lies in the path of movement of the tapered portion 9c of the ratchet 9. But, this does not bar the ratchet 9, because the release lever 15 escapes as it turns about the pin 16.

Figure 10:
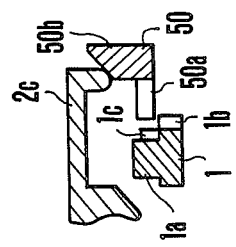
FIG. 10 is a sectional view taken along B—B line of FIG. 9.
Figure 9:
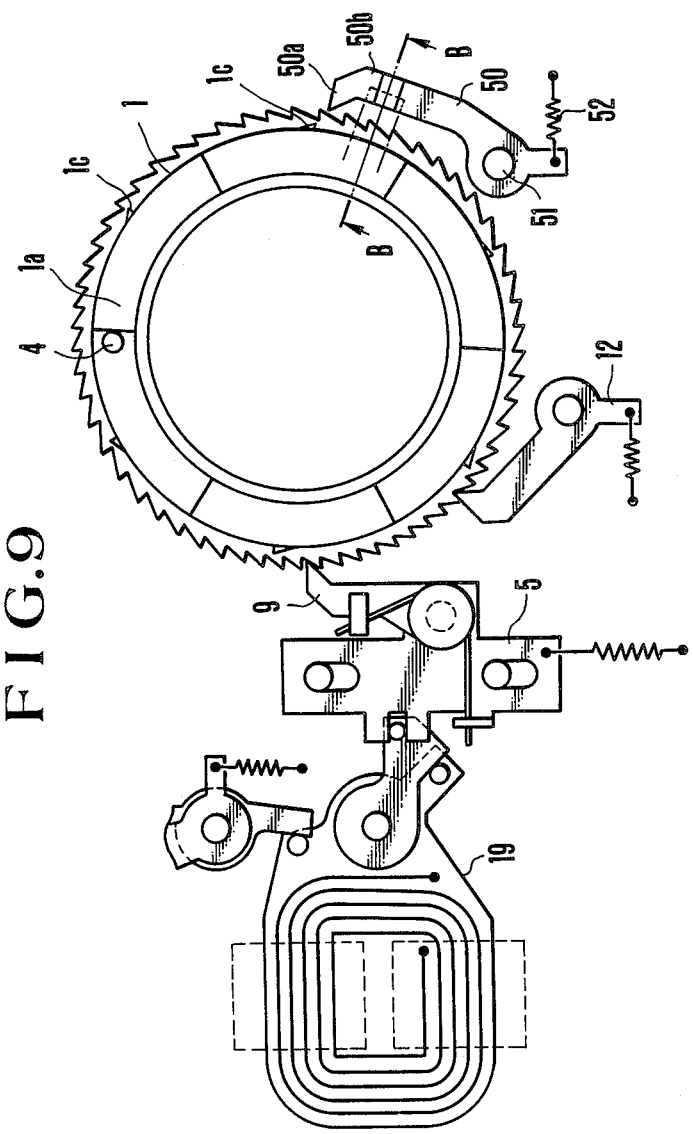
FIG. 9 is a front elevational view of still another embodiment of the driving device according to the present invention.

FIG. 9 is a front elevational view illustrating the construction and arrangement of those of the parts of still another embodiment of the barrel driving device according to the invention which are not found in the foregoing two embodiments, and FIG. 10 is a cross-sectional view taken along line B—B of FIG. 9. Though in the aforesaid second embodiment the ratchet 9 also serves as an arresting member for the distance adjusting ring 1, it is in this third embodiment that the arresting member is provided as a separate member in the form of a pawl lever 50. This lever 50 is pivotally mounted on a pin 51 fixedly mounted to the base plate (not shown) and is urged by a spring 52 in a counter-clockwise direction. 2c is an arm radially extending from the barrel 2. The other parts are the same as in the foregoing embodiments.

The illustrated position represents one of the initial positions, where the arresting lever pawl 50a is retracted from the path of movement of the detent pawl 1c of the distance adjusting ring 1 by the arm 2c of the barrel 2 pushing its taperad portion 50b. As the barrel 2 moves forward (in FIG. 10, upward) to effect focusing, the arresting lever 50 is turned by the spring 52 in the counterclockwise direction until its pawl 50a enters the path of movement of the detent pawl 1c, because of the action of the tapered portion 50b. Therefore, when the cam 1a moves away from the follower 4, the arresting lever pawl 50a engages the detent pawl 1c. Thus, the distance adjusting ring 1 is prevented from overrunning the initial position likewise as in the foregoing embodiment.

According to the third embodiment of the invention, despite the inertia of the distance adjusting ring when the photographic lens barrel instantaneously floats over the ring, the barrel can be reset in the initial position with high accuracy and high reliability.

What is claimed is:

1. A barrel driving device for a camera comprising:
   (a) a photographic lens barrel axially movable from an initial position;
   (b) moving means having a ratchet;
   (c) a cam for moving said photographic lens barrel axially
      said cam operating with movement of said moving means to axially move said photographic lens barrel from the initial position, and, after completion of said movement, to return said photographic lens barrel to the initial position;
   (d) an advancing member arranged upon engagement with said ratchet to move said moving means;
   (e) an engaging member arranged upon engagement with said ratchet to hinder backward movement of said moving means;
   (f) electromagnetic means for operating said advancing means;
   (g) control means for controlling the supply of current to said electromagnetic means, said control means repeating periodic current passage to said electromagnetic means and determining the amount of movement of said photographic lens barrel from said initial position on the basis of the number of times of the repeated current passage;
   (h) a switch for stopping the periodic current passage of said control means in respnse to return of said photographic lens barrel to the initial position; and
   (i) counter means for counting the number of times of the periodic current passage of said counter means and disabling the switch until the value reaches a predetermined value.

2. A device according to claim 1, wherein said cam is provided on said moving means.

3. A device according to claim 1, wherein said moving means is a distance adjusting ring arranged on an outer periphery of said lens barrel.

4. A barrel driving device for a camera comprising:
   (a) a photographic lens barrel axially movable from an initial position;
   (b) moving means having a ratchet;
   (c) a cam for axially moving said photographic lens barrel forward,
      said cam operating with movement of said moving means to axially move said photographic lens barrel forward, and after the terminal end of forward axial movement is reached, to return said photographic lens barrel to the initial position;
   (d) engaging means provided in correspondence to said cam,
      said engaging means being provided on said moving means;
   (e) an advancing member arranged upon engagement with said ratchet to move said moving means;
   (f) a first engaging member arranged upon engagement with said ratchet to hinder the reverse movement of said moving means;
   (g) a second engaging member arranged upon engagement with said engaging means to hinder the movement of said moving means,
      said second engaging member hindering said moving means from being moved by the inertia when said moving means overruns said cam,
   (h) a release member for releasing the engagement of said second engaging member,
      said release member performing an engagement releasing operation in response to movement of said photographic lens barrel to the initial position;
   (i) electromagnetic means for driving motion of said advancing member;
   (j) control means for controlling the supply of current to said electromagnetic means; and
   (k) a switch arranged to open and close when said photographic lens barrel axially moves forward and returns,
      said switch controlling the operation of said control means by its switching operation.

5. A device according to claim 4, wherein said advancing member and said second engaging member are the same member.

6. A driving for the camera optics of a camera comprising:
   (A) moving means moving from an initial position for displacing said optics;
   (B) driving means for driving said moving means step by step by a periodic movement;
   (C) switch means for making said driving means inoperative in response to a return motion of said moving means to said initial position; and
   (D) counter means for counting the number of said periodic movements of said driving means so as to keep said switch means inoperative until the counted value reaches a certain predetermined value.

7. A device according to claim 6, further comprising:
   urging means for returning said moving means to said initial position.

8. A device according to claim 7, further comprising:
   prohibiting means for prohibiting said moving from being returned to said initial position by means of said urging means.

9. A device according to claim 8, further comprising:
   returning means for returning said moving means to said initial position by said urging means in response to arrival of said moving means to an end position.

10. A device according to claim 6, wherein said driving means includes electromagnetic means which drives said moving means by rotating along a first direction from a standard position and carries out an exposure operation by rotating along a second direction from said standard position.

11. A device according to claim 10, wherein said moving means includes focus adjusting means.

12. A driving device for the camera optics of a camera comprising:
   (A) moving means moving from an initial position for displacing said optics;
   (B) driving means for driving said moving means; and
   (C) prohibiting means for prohibiting said driving means from operating beyond a predetermined amount while said moving means is returning to said initial position, said prohibiting means releasing said prohibiting in response to termination of return of said moving means to said initial position.

13. A device according to claim 12, wherein said prohibiting means includes an engaging member engaging with said moving means.

14. A device according to claim 12, further comprising:
   urging means for returning said moving means to said initial position.

15. A device according to claim 14, further comprising:
   prohibiting means for prohibiting said moving means for being returned to said initial position by means of said urging means.

16. A device according to claim 15, further comprising:
   returning means for returning said moving means to said initial position by said urging means in response to arrival of said moving means to an end position.

17. A device according to claim 12, wherein said driving means includes electromagnetic means which drives said moving means by rotating along a first direction from a standard position and carries out an exposure operation by rotating along a second direction from said standard position.

18. A device according to claim 17, wherein said moving means includes focus adjusting means.

* * * * *